United States Patent Office 3,629,451
Patented Dec. 21, 1971

---

3,629,451
METHOD OF TREATING BACTERIAL INFECTIONS
Elton S. Cook and Kinji Tanaka, Cincinnati, Ohio, assignors to Stanley Drug Products, Inc., Portland, Oreg.
No Drawing. Filed Mar. 3, 1969, Ser. No. 803,947
Int. Cl. A61k 27/00
U.S. Cl. 424—319
5 Claims

ABSTRACT OF THE DISCLOSURE

A variety of substances are reported which claim to induce host resistance to coccic infections, none have proven sufficiently effective to warrant their wide spread use. Anti-infectious agents have been found which are effective in inducing resistance to infections due to cocci.

BACKGROUND OF THE INVENTION

This invention pertains to anti-infectious agents effective in protecting against coccic infections.

Bacteria such as cocci are a unique group of organisms embodying within themselves an array of yet unanswered puzzles in biology, both fundamental and experimental. They are ubiquitous in distribution and have attained extreme degrees of diversification in biological and biochemical characteristics.

Treatment of staphylococcal infections is complicated by the ability of the organisms to develop resistance. The magnitude of the problem is further amplified by the extreme difficulty of total eradication, and the frequent reappearance of the same strain even after apparently successful elimination. The inability to eliminate the carrier state by any of the currently known methods and the prevalence of the new antibiotic resistant strains have added a new dimension to the frustrating situation.

Penicillin G (benzyl penicillin) is still the drug of choice for the treatment of infections caused by susceptible coccic strains. However, numerous strains are known which elaborate an enzyme penicillinase in response to the drug and thus remain insensitive. This led to the development of semisynthetic penicillins which are not inactivated by penicillinase. However recently resistance of staphylococci to the newer penicillins has been reported. Hence there is a seemingly never ending demand for anti-coccic factors.

A variety of substances are reported which alter host resistance to coccic infections. However, drugs which induce a resistance to coccic infections when administered prophylactically have questionable value.

SUMMARY OF THE INVENTION

A number of antibiotics contain amino acid residues. However, such alpha amino aliphatic acids have been completely ineffective. In accordance with the practice of this invention it has been found that omega amino acids having three to five carbon atoms between amino and carboxyl groups exhibit a unique activity against coccic infections. The invention thus provides omega amino acids effective in inducing resistance to bacterial infections. Mixtures of these omega amino acids with histidine are particularly effective.

DETAILED DESCRIPTION OF THE INVENTION

The processes of infection leading to disease are accepted to be a problem in the ecology of the parasite. It is being increasingly realized that the bacterial and host determinants are closely interrelated. Staphylococcal virulence derives from the combined action of several bacterial factors whose effectiveness is conditioned by the reactions of the host. Perhaps the most striking feature of host-parasite relationships in staphylococcal infections is the relatively atypical immunologic response. Human studies have given convincing evidence that most adult humans possess an array of anti-staphylococcal antibodies. Nevertheless resistance to staphylococci seems to be governed to a considerable extent by other unrelated factors since these antibodies are of low effectiveness. For this reason attempts at prophylactic administration have been relatively unsuccessful.

In vitro experiments indicate that the omega amino acids contemplated herein do not inhibit the growth of the organism. This is very significant indeed. It means that in the true sense these compounds are not antibiotics. Antibiotics are somewhat poisonous, being more poisonous toward the organism than toward the host. Although the in vitro tests showed that these compounds do not kill the organism. Surprisingly, in the system of the host they create an environment in which the organism apparently cannot grow. Thus they unexpectedly render the host immune, as does a vaccine, but without the organism itself being present as it is in vaccines and without antibody formation. The compositions of this invention thus constitute a new class of anti-infectious agents. They are not as long lasting as some antimicrobials. Hence it is contemplated that they will be taken periodically orally, or by subcutaneous injection at fairly frequent intervals.

The anti-infectious agents contemplated herein are omega amino carboxylic acids having the formula $$H_2NCH_2\text{—}COOH$$

wherein R is —CH$_2$CH$_2$—, —CHOHCH$_2$—

—CH$_2$CH$_2$CH$_2$—, or —CH$_2$CH$_2$CH$_2$CH$_2$—

The high degree of resistance to staphylococcal infections obtained by the prophylactic administration of these omega amino acids will best be apparent from their biological effects in in vivo studies. Since such amino acids are well known, their preparation need not be described herein. Inasmuch as they are soluble in water, aqueous solutions were administered.

Throughout the course of these studies Boontucky, C3H and Swiss albino mice, both male and female, were used. The animals were between 10 and 30 weeks old and had an approximate average weight of 20 to 25 grams. These animals were mostly raised and maintained on the Rockland diet.

The assays were conducted using a penicillin-resistant strain, Staphylococcus aureus orginal, first isolated from a case of acute tonsilitis and maintained in our laboratories for years. This strain is preserved in the lyophilized form and stored at 0° C. and stock cultures were raised on SA 110 slants once in every 6 months. For testing, the inoculum was prepared as 24 hour cultures from Bacto-Staphylococcus Medium 110. The cells were washed and suspended in physiological saline (TC Tyrode Solution, Difco). In contrast to conventional procedures, a dose killing 80 to 90 percent (LD$_{80-90}$) instead of a dose killing 50 percent (LD$_{50}$) was used in these investigations. This has been the practice in our laboratories in studies with staphylococci since lower dosages often fail to give adequate degrees of mortality. The LD$_{80-90}$ was determined by injecting groups of mice subcutaneously with different dilutions of the bacterial suspension and noting the mortality over a 5-day period.

Using groups of six to ten mice both long term and sort term biological assays of the various omega amino acids were conducted. The animals were inoculated subcutaneously with various amounts of omega amino acids and then challenged with a 60 percent suspension of the "original strain" organism. During previous testing of materials exhibiting antistaphylococcal activity it was found that some anticoccic materials were longer lasting than others. Whereas some antimicrobials are effective for days, omega amino acids express their anticoccic activity for only a few hours. For this reason both long and short term evaluations were indicated. In short term assays half the dose of the material was injected subcutaneously into mice 2 hours prior to subcutaneous inoculation with *S. aureus*, and the second half of the drug was injected 4 hours later. In the tables which follow deaths are recorded at 24, 48, 72, and 96 hours after the treatment. For convenience IUPAC-IUB abbreviations are employed in the tables, i.e. Gly for glycine (or alpha-aminoacetic acid); b-ala for beta-alanine (or beta-aminopropionic acid); Gaba for gamma-aminobutyric acid; Gabob for gamma-amino-beta-hydroxybutyric acid; Dava for delta-aminovaleric acid; and Eaca for epsilon-aminocaproic acid.

TABLE 1.—OMEGA AMINO ACIDS, PROPHYLACTIC, SHORT TERM

| Drug | Dose per animal in mg. | Percent mortality in hours, post-challenge | | | |
|---|---|---|---|---|---|
| | | 24 | 48 | 72 | 96 |
| Control | | 100 | 100 | 100 | 100 |
| Gly | 7.5 | 77 | 88 | 88 | 100 |
| b-ala | 7.5 | 55 | 88 | 88 | 88 |
| Gaba | 7.5 | 66 | 88 | 88 | 88 |
| Dava | 7.5 | 33 | 44 | 44 | 44 |
| Eaca | 7.5 | 75 | 87 | 87 | 87 |
| Control | | 75 | 80 | 80 | 92 |
| Gaba | 5.0 | 50 | 70 | 70 | 70 |
| Control | | 50 | 67 | 67 | 83 |
| Dava | 5.0 | 11 | 33 | 33 | 33 |
| Control | | 70 | 90 | 90 | 90 |
| Gaba | 5.0 | 30 | 50 | 50 | 50 |
| Gabob | 5.0 | 10 | 30 | 30 | 30 |
| Control | | 75 | 92 | 92 | 92 |
| Eaca | 5.0 | 40 | 40 | 40 | 40 |

These data illustrate the definite value of omega amino acids having four to six carbon atoms in protecting mice against experimental staphylococcal infections. It was found that the optimum length of the molecule from the N of —$NH_2$ to the C of —COOH is 6.3 to 6.5 angstrom units. Thus the activity peaks at the 5-carbon acid. The straight chain omega-amino acids glycine (2 carbons) and beta-alanine (3 carbons) have very low, if any, antistaphylococcal activity. Gamma-aminobutyric acid (4 carbons) is active and gamma-amino-beta-hydroxybutyric acid (4 carbons) is somewhat better. Delta-aminovaleric acid (5 carbons) is best, and epsilon-aminocaproic acid (6 carbons) is active but not quite as good.

Since delta-aminovaleric acid was best, it was decided to evaluate its effectiveness when administered orally. Results obtained are reported in Table 2.

TABLE 2.—OMEGA AMINO ACIDS, PROPHYLACTIC, SHORT TERM

| Drug | Dose per animal in mg. | Percent mortality in hours, post-challenge | | | |
|---|---|---|---|---|---|
| | | 24 | 48 | 72 | 96 |
| Control | | 60 | 70 | 70 | 70 |
| Dava | 10 | 0 | 43 | 57 | 57 |

Whereas foregoing show that delta-aminovaleric acid is effective when administered orally, it was found that gamma-aminobutyric acid and epsilon-aminocaproic acid were effective for only a few hours, the presumption being that orally administered acids are excreted. Consequently larger or more frequent doses are required.

In long term tests aqueous solutions were administered subcutaneously in divided doses over three days; on the 4th day (24 hours after the last drug injection) the mice together with a control group were challenged subcutaneously in the groin with a predetermined dose of a saline suspension of a penicillin-resistant strain of *Staphylococcus aureus*. Mortalities were recorded daily for five days. The first experiments were conducted on female C3H/HeJ mice, 10 to 14 weeks old, which are particularly susceptible to *S. aureus* infection. In later experiments female Swiss albino mice 12 to 14 weeks old were used. As shown in Table 3 this strain is somewhat less susceptible to *S. aureus* than the C3H.

TABLE 3.—OMEGA AMINO ACID, PROPHYLACTIC, LONG TERM

| Drug | Dose per animal in mg. | Percent mortality in days, post-challenge | | | | |
|---|---|---|---|---|---|---|
| | | 1 | 2 | 3 | 4 | 5 |
| C3H mice | | | | | | |
| Control | | 80 | 90 | 90 | 90 | 90 |
| Gaba | 1.0 | 30 | 50 | 50 | 50 | 50 |
| Eaca | 1.3 | 0 | 10 | 20 | 20 | 20 |
| Swiss mice | | | | | | |
| Control | | 50 | 50 | 60 | 60 | 60 |
| Dava | 5.0 | 30 | 30 | 30 | 50 | 50 |
| Eaca | 5.0 | 44 | 56 | 56 | 56 | 67 |

Results in Table 3 demonstrate that epsilonaminocaproic acid was significantly active in C3H mice but exhibited low activity in Swiss mice. These were long term evaluations, and they illustrate that these drugs must be administered at more frequent intervals than some antimicrobials. Gamma-aminobutyric acid was active in C3H mice whereas delta-aminovaleric acid displayed low activity in Swiss mice. In the long term tests the challenge inoculation was given 24 hours after the drug infection. In short term tests the inoculation is given two hours after administration. Thus prior to periods where contact with staphlococci or streptococci infections ar more likely, such as prior to entering a hospital, and during the stay, injections or tablets will be prescribed by the physician to be taken every four hours.

It has been found that the activity of the drugs contemplated herein can be further enhanced by mixing these omega amino acids with the amino acid histidine (either d-, l- or dl-histidine). These can be mixed in a molar ratio of one to two mol omega amino acid to one mol histidine. This improvement will best be apparent from Table 4 wherein a 1 to 1 mol ratio was used.

TABLE 4.—OMEGA AMINO ACID, PROPHYLACTIC, SHORT TERM

| Drug | Dose per animal in mg. | Percent mortality in hours, post-challenge | | | |
|---|---|---|---|---|---|
| | | 24 | 48 | 72 | 96 |
| Control | | 75 | 80 | 80 | 922 |
| Dava plus His | 10 | 20 | 40 | 40 | 40 |
| Control | | 60 | 80 | 80 | 80 |
| Gaba plus His | 5.2 | 20 | 30 | 40 | 40 |
| Control | | 60 | 70 | 80 | 90 |
| Gaba plus His | 10 | 10 | 30 | 40 | 40 |
| Dava plus His | 10 | 20 | 50 | 50 | 50 |

The data in Table 4 show that a marked improvement is obtained by mixing the omega amino acids of this invention with the histidine. This is perhaps more apparent from Table 5 which is based on a statistical compilation of results using Gaba.

TABLE 5

Omega amino acid—prophylactic

Drug:                            Percent mortality in hours
   Control ------------------------------------ 95
   Gaba --------------------------------------- 73
   Gaba plus His ------------------------------ 58

The compositions of this invention thus constitute a significant new class of anti-infectious agents. It is contemplated that they will be taken orally periodically like vitamins, say in 250 to 500 milligram tablets. Prior to periods where contact with staphylococci or streptococci infections are more likely, such as prior to entering a hospital, injections of say 150 to 500 mg. will be used by the physician. The omega amino acid can be combined with an aqueous, vegetable oil, monoglyceride or diglyceride vehicle for injection, sodium chloride being used if necessary to render the solution isotonic. The suspension or solution will contain 0.1 to 5 percent, preferably 0.1 to 1.5 percent of the omega amino acid by weight.

In the case of tablets, if desired, suitable colorants, adhesives, and lubricants will be incorporated along with a solid pharmaceutical diluent, for instance, starches, lactose, sucrose and other pharmaceutical diluents. These tablets will contain 50 percent to 75 percent of the omega amino acid on a weight basis. Capsules can also be made. Thus a process is provided for the control of infections in humans and other mammals due to cocci which involves administering to the mammal a prophylactically effective amount of the omega amino acid. Various diluents, doses, and other variations and modifications will occur to those skilled in the art. Thus it has been pointed out that tablets must be administered more frequently than injections. Such ramifications are deemed to be within the scope of this invention.

What is claimed is:

1. A method of treating bacterial infections in mammals comprising administering to a mammal suffering from said bacterial infection an antibacterial effective amount of gamma-amino-beta-hydroxybutyric acid.
2. The process of claim 1 wherein the bacterial infection is due to a coccus.
3. The process of claim 2 wherein the coccus is *Staphylococcus aureus*.
4. The process of claim 1 wherein the gamma-amino-beta-hydroxybutyric acid is in admixture with a solid pharmaceutical diluent.
5. The process of claim 1 wherein the gamma-amino-beta-hydroxybutyric acid is in the form of an aqueous suspension.

References Cited

Chemical Abstracts I 61: 7568h–7569a (1964).
Chemical Abstracts II 67: 20544s (1967).

JEROME D. GOLDBERG, Primary Examiner